INVENTORS
SERGIO FINZI,
JACQUES F. FAURE,
JEAN P. LEBRUN

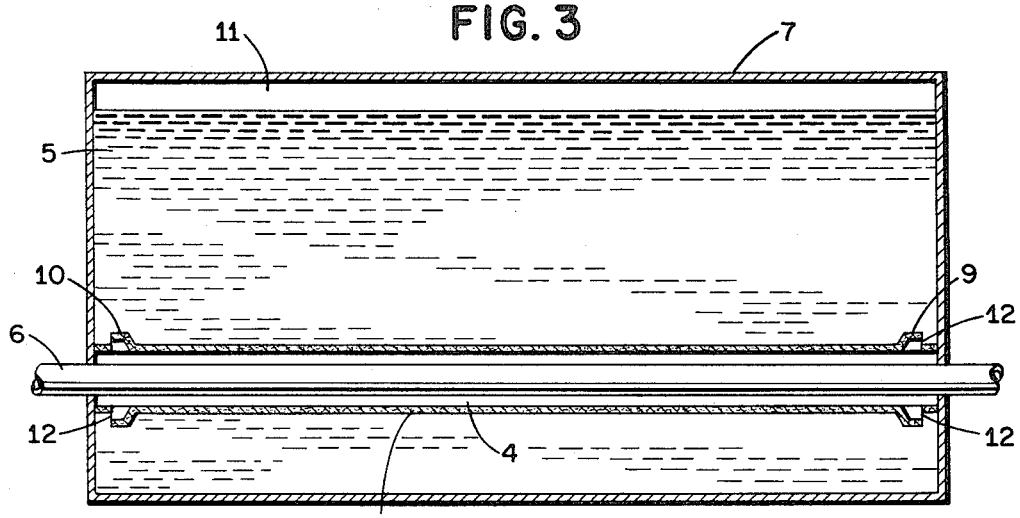
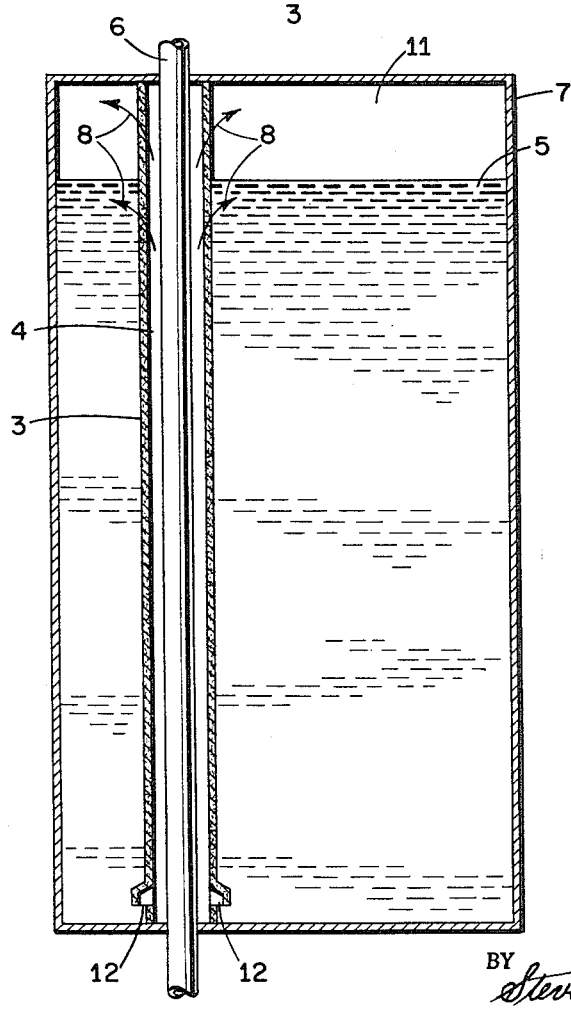

United States Patent Office 3,396,079
Patented Aug. 6, 1968

3,396,079
THERMAL INSULATION FOR AN INTERNALLY HEATED HOT TUBE IMMERSED IN A COLD LIQUID
Sergio Finzi, Masnago, and Jacques F. Fauré and Jean P. Lebrun, Cocquio, Italy, assignors to European Atomic Energy Community (Euratom), Brussels, Belgium
Filed June 3, 1966, Ser. No. 555,191
Claims priority, application Belgium, June 16, 1965, 14,213, Patent 665,555
4 Claims. (Cl. 176—43)

ABSTRACT OF THE DISCLOSURE

A thermal insulation for a hot tube immersed in a relatively cold liquid comprising a casing of porous and flexible material disposed concentrically around the hot tube and spaced a distance of a few millimeters therefrom so as to bound an annular jacket of vapor of said liquid.

---

The invention relates to a new type of thermal insulation for a hot tube immersed in a relatively cold liquid, such thermal insulation being embodied with little material and, in preferred forms, automatically assuming a central position around the hot tube.

The invention is particularly, but not exclusively, concerned with thermal insulation of the tubes of heavy water moderated nuclear reactors of the hot pressure tube type. In such reactors a system to provide good thermal insulation has to be inserted between the hot pressure tubes and the cold heavy water and such system should be substantially non-absorbent with respect to neutrons and should absorb very little heat under the effect of gamma rays. One solution already used to embody this insulation is to surround the pressure tube with a metal tube known as the calender tube. Thermal insulation is obtained in the resulting annular space by means of a layer of gas which may be static or flow at low speed. Although this solution operates satisfactorily it does have disadvantages, for example in the case where there is flow of the gas it requires the use of a fairly complex circuit to provide the flow of insulating gas, such circuit being provided with pumps, filters for the radioactive dusts, sealing devices, and so on. Also, the metal calender tube absorbs a considerable amount of neutrons. Another disadvantage of the calender tube is that if it is to be effective it must be exactly centered around the pressure tube, not only at its two ends, but also along the entire length, and this makes its manufacture and assembly difficult and makes it necessary to use struts or spacers which reduce the thermal efficiency.

The thermal insulation according to the invention may be self-centering and is characterized by a casing of porous material disposed concentrically around the hot tube and spaced a few millimeters away from the latter so as to bound an annular jacket for the vapor of the said liquid.

The invention will be more readily understood from the accompanying drawings wherein:

FIGURE 3 is a diagram showing, by way of example, just one horizontal pressure tube (for the sake of clarity) extending through the tank of a cold-liquid moderated nuclear reactor, the pressure tube being hot and thermally insulated from the moderator by means of an insulation according to the invention; and FIGURE 4 is a similar diagram to FIGURE 3, in which the pressure tube is vertical.

The insulating material used is the dry vapor of the heavy water of the moderator, the thermal conductivity of which is very low. The wall of the pressure tube of the reactor is at a temperature such that the heavy water vaporizes on contact therewith.

To maintain this vapor along the tube and prevent its dispersion in the moderator and also to prevent boiling, which would increase the heat transfer and also be unacceptable from the neutron aspect, it is only necessary to provide a porous insulant casing a few millimeters away from the hot tube, for example felt or strips of silica or carbon, in which the temperature drop is sufficient for its inner surface to be in contact with the vapor and its outer surface to be in contact with the liquid of the moderator without boiling occurring at any place.

Figure 1:
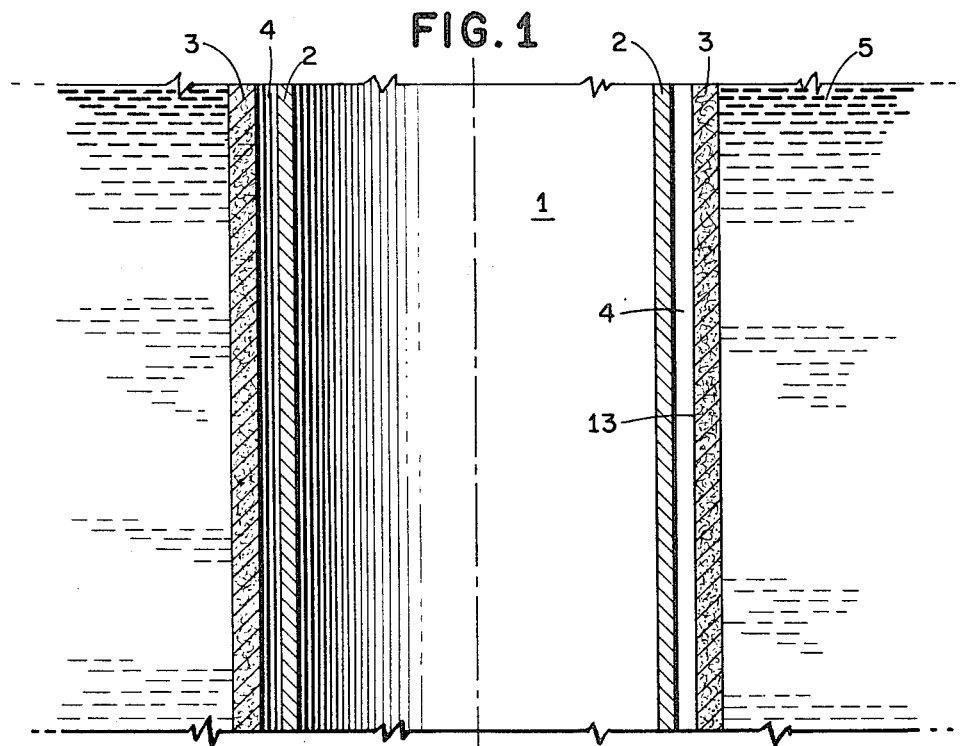
FIGURE 1 is a diagram illustrating the principle of the invention.

Referring now to FIGURE 1, a nuclear reactor duct 1 contains fuel elements and the coolant and is bounded by a hot pressure tube 2. A casing 3 consisting of a porous fabric which is substantially non-absorbent in respect to the neutrons and which heats up only very little under the effect of gamma radiation, surrounds the pressure tube 2 and is spaced a few millimeters therefrom. By way of example, a casing of this kind was made from 0.3 mm. strips of silica felt ($SiO_2$) having a 50% porosity and disposed in five layers. A casing made in this way behaves with respect to neutrons in the same way as a sintered aluminum powder (SAP) tube of a thickness of 0.2 mm. Between the pressure tube 2 and the porous casing 3 is an annular space 4 filled with dry vapor of heavy water, which is imprisoned therein. The few milimeters spacing between the hot tube and the porous casing is sufficient to provide good insulation by means of the vapor but small enough to prevent convection movements from starting in the layer of vapor. The inner wall of the casing is in contact with the heavy water vapor while its outer wall is in contact with the liquid heavy water 5 in the tank.

Figure 2:
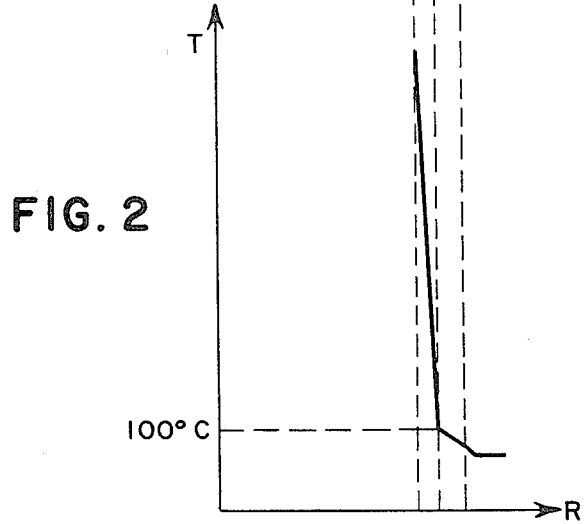
FIGURE 2 is a graph showing how the temperature decreases between the hot tube and the cold liquid.

The graph illustrated in FIGURE 2 shows the temperature against the distance R from the center of the duct 1. With increasing distance from the outer wall of the hot pressure tube there is initially a very rapid temperature drop in the annular space 4, and on the inner wall of the casing 3 this temperature is only 100° C. This part of the curve clearly shows the appreciable insulating power of the dry vapor.

The temperature then drops about 20° within the thickness of the casing 3, which contains practically only heavy water droplets imprisoned in the fine pores of the casing, the vapor being practically only on the inner surface thereof. This temperature drop in the thickness of the casing is sufficient to prevent any boiling from occurring, such boiling resulting in heat exchange with the heavy water and being undesirable from the neutron aspect.

Finally there is a small temperature gradient in the limiting layer of heavy water around the outer wall of the casing.

FIGURE 3 shows the application of a thermal insulation according to the invention to a horizontal pressure tube 6 extending through the tank 7 of a nuclear reactor filled with heavy water 5 surmounted by a gaseous atmosphere 11. At its ends 9 and 10, the porous casing 3 may, although this is not essential, have one or more narrow slots, e.g. 12, for the passage of heavy water. When the reactor is cold, the liquid heavy water fills the annular space 4. As the reactor temperature rises, the heat of the tube 6 causes the heavy water in the space 4 to be vaporized. As the heavy water vaporizes, the pressure of the vapor increases progressively thereby expelling the liquid to the tank through the porous fabric and the slots 12 (if provided), until there is only vapor left in the space 4. Also, the pressure of this vapor inflates the case 3 which is thus automatically centered around the tub 6. A thermal insulation according to the invention is thus obtained. The above description shows how simple this type of insulation is.

If the pressure tubes are vertical, it may be advantageous to use a slightly different arrangement as will be described hereinafter.

The point is that with a vertical arrangement there may be a convection flow of vapor, with vapor leaving by the top slot or slots and the upper part of the porous casing, and with heavy water entering via the bottom slot or slots and the bottom part of the porous casing. This transport of material reduces the insulating properties of the vapor jacket contained in the annular space 4.

To obviate the convection flow through the slots, the latter has to be shut off from those causing the annular space 4 to communicate with the heavy water 5 in the tank at one of the ends of the casing, either the top or bottom end. A preferred arrangement in which the top part of the casing has been shut off is shown in FIGURE 4, in which, in relation to the other figures, like reference numerals have been used for like elements. The slot or slots 12 should be horizontal and disposed at the same level to avoid any convection flow or "chimney effect" in the insulating space. The closure mentioned hereinbefore may not be sufficient to prevent a convection flow from occurring, because the heavy water vapor may diffuse, by the effect of its pressure, in the direction of the arrows 8 through the top part of the porous casing 3 (the hydrostatic counterpressure of the heavy water 5 and of the nitrogen or helium 11 being lower in the top of the tank than in the bottom), heavy water entering at 12 and being vaporized and replacing the vapor which has disappeared as a result of diffusion, and this is equivalent to a fresh convection flow occurring.

To obviate this disadvantage, the inner surface 13 of the casing 3 (FIGURE 1), for example, is sealed by the application of a very thin sheet or layer (of a thickness of 1/100 mm. and less) of a sealing-tight material which is substantially non-absorbent with respect to neutrons, e.g. aluminum, magnesium, beryllium, or some plastic materials. The only object of this is to seal the inner surface of the porous casing 3 while absorbing the minium amount of neutrons. Thus it is possible to use a sheet of metal paper or the like, or the sealing material may be sprayed with a gun without regard to its own mechanical properties, since the forces it has to withstand are negligible.

The bottom part of the casing may be closed and the top part may be left open, the opening in this case being situated in the helium or nitrogen atmosphere above the heavy water. This is not such an advantageous solution as the previous one, since even though the annular space 4 is initially filled with heavy water vapor it will progressively fill with nitrogen or helium of the tank atmosphere, since diffusion between the two media is inevitable.

Since the thermal conductivity or helium is six times greater than that of the heavy water vapor, it will immediately be apparent that this solution is less advantageous. Also, in this case, the hydrostatic pressure of the heavy water in the bottom of the tank is counterbalanced in the space 4 only by the pressure in the atmosphere 11, so that the flexible casing will tend to crush in at the bottom. Thus although slots can be formed in the casing at any level below the heavy water, it is preferable for a similar reason (the crushing of the casing at the bottom) for them to be situated in the bottom of the casing.

The invention has numerous advantages: it is very simple to embody, it requires the use of a minimum of material—and this is advantageous in respect of limiting heating by gamma radiation absorption, and for good neutron economy, particularly since the material used for making the casing 3 and/or the sealing sheeting 13 can be selected solely with regard to neutron requirements and disregarding problems associated with mechanical stresses. The casing 3 may, for example, be made of a felt or fabric of silica or carbon. As already mentioned, a casing made with five layers of 0.3 mm. thick silica fabric having a 50% porosity is equivalent to a maximum thickness of 0.2 mm. SAP as regards neutrons. Carbon felt is even more advantageous.

With an equivalent SAP thickness of 0.3 mm., which is an excessive value, the saving in respect of the thickness of the calender tube as compared with gas insulation and calender tube (SAP thickness 2.5 mm. or Zircaloy thickness 1.5 mm.), in the case of a reactor containing 500 ducts 6 meters long, is about 6 metric tons of SAP or 8 metric tons of Zircaloy.

Another advantage of the invention is that the casing 3 is automatically centered around the tube 2 because it swells under the effect of the pressure of the vapor jacket contained in the space 4. This flexible insulation is also practically uninfluenced by vibration, impacts or any seismic shocks. It starts operating again normally as soon as a disturbance has disappeared. If the reactor using an insulation according to the invention is cooled by an organic liquid which solidifies at normal temperatures, it is very easy to defrost the ducts after reactor shutdown, the only requirement being to bring the heavy water bathing the pressure tubes to a temperature sufficient to melt the heat-vehicle material.

The application of this invention is not limited just to nuclear reactors moderated by heavy water or any other cold liquid. It can be used in any case where efficient and lightweight thermal insulation is required between a hot tube and a cold liquid, for example in space propulsion. Also, this insulation can be very easily adapted to cases in which the hot tubes 2 are not rectilinear. The casing is simply held in place so that it does not tend to touch the hot tube at bends.

Although the invention is of particular advantage when using a flexible casing, it is possible of course to use a rigid porous casing.

We claim:

1. A thermal insulation for an internally heated hot tube immersed in a cold liquid comprising a casing of porous, lightweight, flexible material disposed concentrically around the hot tube at a distance of a few millimeters therefrom so as to bound an annular jacket or vapor of said liquid, said casing being self-centering around said tube and having its outer surface in direct contact with said cold liquid, slots provided in at least one end of said porous casing, said slots being situated at the same level and enabling the vapor jacket and the liquid to be brought into communication with one another to reduce convection, and a thin sealing coating being applied to the inside to the inner surface of said porous casing.

2. A thermal insulation according to claim 1 in which the hot tube is a hot pressure tube in a nuclear reactor moderated by a cold liquid, said casing being made from a material which is substantially non-absorbent with respect to neutrons and which heats up only slightly as a result of gamma radiation.

3. A thermal insulation according to claim 1 in which said tube and casing are substantially vertical, said annular jacket and said liquid being in communication at the bottom end of said casing.

4. A thermal insulation according to claim 2 in which both said casing and said thin sealing coating are made from a material which is substantially nonabsorbent with respect to neutrons and which heats up only slightly as a result of gamma radiation.

References Cited

UNITED STATES PATENTS

| | | | |
|---|---|---|---|
| 3,085,961 | 4/1963 | Charlesworth | 176—43 X |
| 3,108,053 | 10/1963 | Vrillion et. al. | 176—43 X |
| 3,197,379 | 7/1965 | Alfille et al. | 176—43 |
| 3,280,003 | 10/1966 | Alfille et al. | 176—43 |
| 2,676,773 | 4/1954 | Sanz et al. | 165—135 X |
| 3,138,009 | 6/1964 | McCreight | 60—316 X |

FOREIGN PATENTS 893,184   4/1962   Great Britain.

REUBEN EPSTEIN, *Primary Examiner.*